No. 856,637. PATENTED JUNE 11, 1907.
H. HEUSER.
PROCESS OF MALTING.
APPLICATION FILED JAN. 18, 1907.
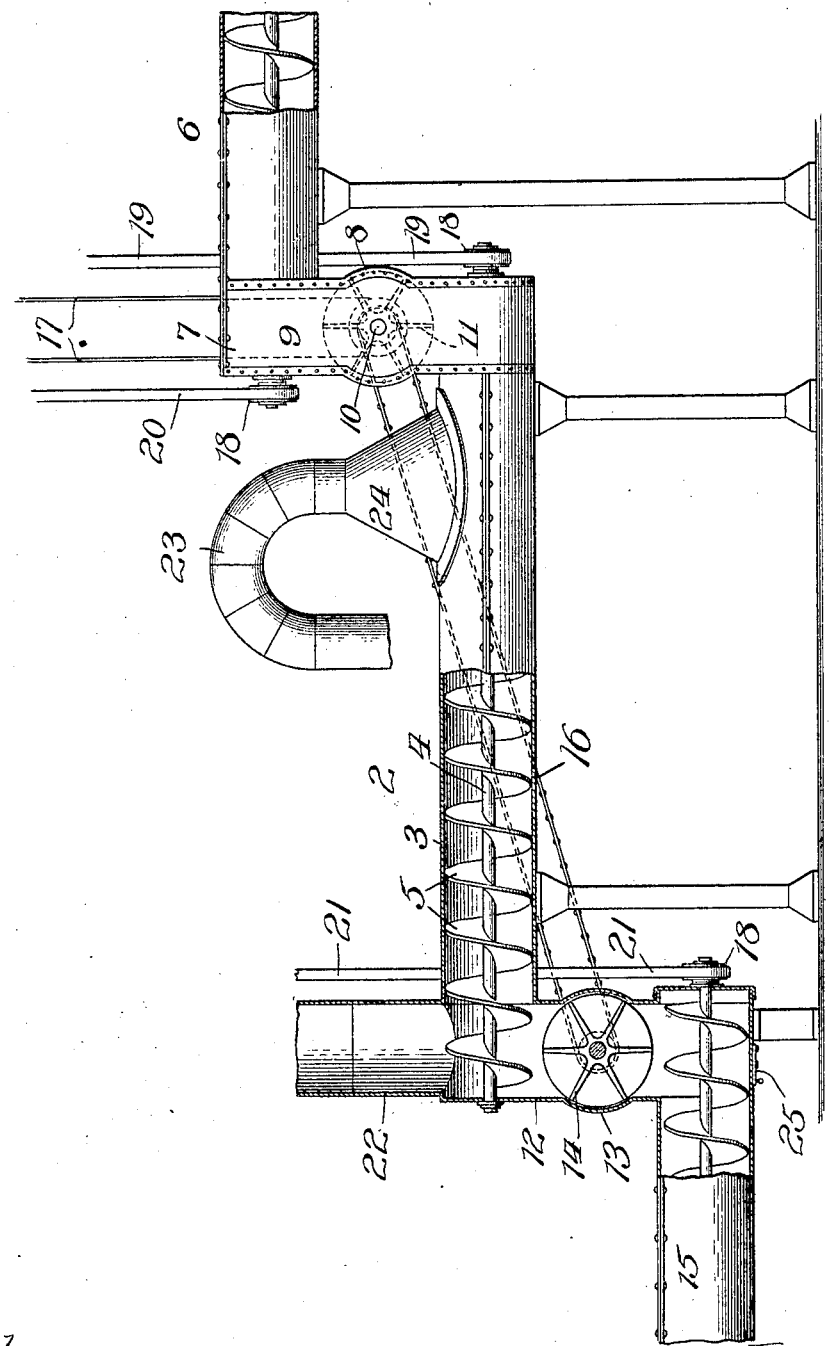
Witnesses:
Inventor
Herman Heuser,
By Dyrenforth, Dyrenforth, Lee & Wiles,
Attys.

UNITED STATES PATENT OFFICE.

HERMAN HEUSER, OF CHICAGO, ILLINOIS.

PROCESS OF MALTING.

No. 856,637. Specification of Letters Patent. Patented June 11, 1907.

Application filed January 18, 1907. Serial No. 352,922.

*To all whom it may concern:*

Be it known that I, HERMAN HEUSER, a citizen of the United States, residing at Chicago, in the county of Cook and State of Illinois, have invented a new and useful Improvement in Processes of Malting, of which the following is a specification.

The process of malting involves, as the essential steps, first steeping the grains, then germinating them and, finally, drying or kilning the germinated grains. The preparatorily steeped grain used for malting, such as barley, rye, corn, wheat and oats, is commonly introduced to the germinating chamber or apparatus from the "steeps" or steeping tanks in a wet or moist condition. I have discovered that the moisture superficially adhering to the husk of the steeped grain, and which forms a film upon it, is detrimental to sprouting inasmuch as it obstructs access to the grain and more particularly to the germ-end of the kernel, in the first stage of the germinating action, when the vitality of the grain is low, of the free supply of oxygen necessary to promote healthy growth; and my invention consists in removing this superficial moisture preparatory to subjecting the steeped grain to germination, with the advantageous results hereinafter explained.

The accompanying drawing illustrates, by a broken view in side elevation, an apparatus suitable for the practice of my invention.

In an air-tight cylindrical shell or tube 3 is rotatably mounted the shaft 4 carrying flights 5, to form a spiral conveyer 2, the flights extending as close as possible to the inner wall of the cylinder without contacting therewith. An incased conveyer 6, like the conveyer 2 except that its casing is not cylindrical, leads from the grains-steeping apparatus (not shown) to a chamber 7 forming the connection between the outlet end of the conveyer 6 and the inlet end of the conveyer 2, this chamber containing in an enlarged section 8, between its ends, a rotary valve 9 consisting of a shaft 10 having arms 11 extending radially from it at uniform distances apart. These arms are of a length to extend close to the inner circumferential wall of the section 8 and of a width to fit closely between the ends of the section and thus always practically shut off communication between the conveyers 6 and 2. A chamber 12 forms a connection between the discharge end of the conveyer 2 and the inlet-end of a conveyer 15, leading to the germinating apparatus or chamber (not shown) and in construction like the conveyer 6. The chamber 12 is formed with an enlarged section 13 between its ends, containing a rotary valve 14 in all respects like the valve 9 and practically closing communication between the conveyers 2 and 15. The shafts of these rotary valves carry sprocket-wheels at which they are geared together by a chain 16 to be driven by a belt-connection 17 from one shaft with a driving-shaft (not shown). The shafts of the three conveyers 6, 2 and 15 are connected by pulleys 18 on their projecting ends with a driving-shaft (not shown) through the medium of belts 19, 20 and 21, to be driven at the same speed. The chamber 12 communicates from its upper end through a tube 22 with a supply of dry air (not shown), which is the preferred medium for removing the surface-moisture from the steeped grains; and a curved tube 23 having an expanded base 24, at which it is fastened upon the casing 5 of the conveyer 2 near its inlet-end, communicates with an ordinary suction-fan (not shown). It is preferred to heat the air used to a temperature of 200° F., or even higher.

The operation is as follows: After the grain has been steeped and preferably after the water has been drained off, as usual, the conveyers 6, 2 and 15, the rotary valves 9 and 14 and the suction-fan are put in motion. The fan draws dry air through the tube 3. On opening the steeps, the steeped grain drops into the conveyer 6 wherein it is carried to the chamber 7, from which the rotary valve 9 delivers it into the conveyer 2. The action of the conveyer 2 stirs the grain and thereby thoroughly exposes it to the evaporating action of the air-currents, the course of which being counter to that of the feed of the grain and obstructed by the flights, retains the air in contact so long with the grain as to thoroughly remove all moisture adhering to its surface. On reaching the discharge-end of the conveyer 2, the grain now thoroughly relieved of the objectionable superficial moisture, is delivered by the action of the rotary valve 14 to the conveyer 15, which discharges it to the germinating chamber or apparatus, referred to, where it is sprouted in a usual or any suitable manner.

The condition of the grain, as to superficial dryness, may be inspected from time to time, upon withdrawing a small quantity through a gate indicated at 25 and provided in the bottom of the chamber 12.

The purpose and effect of malting is to dissolve the mealy body of the grain, called endosperm, into readily convertible starch and valuable albuminoids by growing the latent enzymes of the grain and by their action upon the endosperm; and when this purpose is properly attained, it is accompanied by the production of such a surplus quantity of enzymotic bodies as is required in the various uses to which malt is put, for the saccharification of the readily convertible starch, when the proper addition of other starchy material is made, according to the particular use to which the malt is put. The more thoroughly the mealy body of the grain is dissolved, the better will be the final product.

As the more important advantages of my invention, the following may be mentioned: By ridding the grain of the objectionable superficial moisture as an intermediate step between the steeping and germinating steps of malting, and thus in its course to the sprouting point, not only is more thorough dissolution of the mealy body of the grain obtained in germinating, but a purer germination from the bacterial point of view, and a resultantly superior quality of malt. With the moisture removed from the surface of the grain, it begins to germinate in a far shorter period of time than when wet, or moist on the surface, as heretofore, whereby the enzymes are afforded more time in which to grow and act upon the mealy body, resulting in its better dissolution. Moreover, the steeped grain, when subjected to my improvement, develops acrospires and roots of more uniform length and thickness, and comparatively few of the kernels fail of germination, which facts are important results of the thorough dissolution referred to; whereas when the steeped grain is subjected to sprouting when in the superficially wet or moist condition, as hitherto, a large portion of the grain becomes only partially sprouted and therefore only partly dissolved, and a considerable portion of the kernels show no indication whatever of sprouting, and are not dissolved at all. Such imperfectly grown and ungerminated kernels not only represent a direct loss of extract obtainable from properly malted grain, but by yielding an inferior extract, they impair the qualities of the article made from the malt. Thus, for example, beers made from malt containing a large number of ungrown kernels, are inferior in keeping quality; and bakers' yeast made from such malt is lacking in proper expansion-power. Furthermore, since my improvement induces earlier and more even growth of the steeped grain, the germinating process may be conducted at lower temperatures than are now required, whereby a greater quantity of valuable substance is retained in the kernels, with the result that the finished malt not only represents a correspondingly larger quantity but yields a larger quantity of extract. Finally, as a further important advantage resulting from my improved treatment, may be mentioned the reduced quantity of bacteria and mold-fungi always copiously adhering to the husk of steeped barley and other grain, this reduction resulting from the action of the drying air-currents, which, because of their intimate contact with each grain, carry off the greater part of these organisms. The microorganisms that remain on the husks of the grain can not multiply to any great extent during the germinating process because of the absence of moisture, which is necessary for their propagation. To this removal of the larger part of the bacteria and mold-fungi and the checking of their propagation is attributable the purer flavor and taste of the malt made with the employment of my invention.

What I claim as new and desire to secure by Letters Patent is—

1. The process of malting, which consists in steeping the grains, removing from substantially all of the grains substantially all the superficial moisture and retaining substantially all the moisture within the grains, and then subjecting the grains thus superficially dried to germination.

2. The process of malting, which consists in steeping the grains, separating the grains from the steeping water, removing from substantially all of the grains substantially all the superficial moisture and retaining substantially all the moisture within the grains, and then subjecting the grains thus superficially dried to germination.

3. The process of malting, which consists in steeping the grains, evaporating from substantially all of the grains substantially all the superficial moisture while they are in transit from the steeping tank to the germinating chamber, retaining substantially all the moisture within the grains, and then subjecting the grains thus superficially dried to germination.

4. The process of malting, which consists in steeping the grains, evaporating from substantially all of the grains substantially all the superficial moisture while in transit from the steeping tank to the germinating chamber by forcing currents of dry air through the mass of such grains, and retaining substantially all the moisture within the grains, and then subjecting the grains thus superficially dried to germination.

5. The process of malting, which consists in steeping the grains, evaporating the superficial moisture from the grains in their course from the steeping tank to the germinating chamber by forcing currents of dry air through them in the direction counter to their course of movement, and then subjecting the grains thus dried to germination.

6. The process of malting, which consists in steeping the grains, transferring the steeped grains under confinement against the access of the surrounding atmosphere from the steeping tank to the germinating chamber and, while in transit and under such confinement evaporating from the grains the superficial moisture, and then subjecting the grains to germination.

7. The process of malting, which consists in steeping the grains, transferring the steeped grains under confinement against the access of the surrounding atmosphere from the steeping tank to the germinating chamber and while in transit and under such confinement stirring the grains and evaporating from them the superficial moisture, and then subjecting the grains to germination.

HERMAN HEUSER.

In presence of—
  J. H. LANDES,
  C. W. WASHBURNE.